(12) United States Patent
Hosoya et al.

(10) Patent No.: US 10,769,153 B2
(45) Date of Patent: Sep. 8, 2020

(54) COMPUTER SYSTEM AND METHOD FOR SETTING A STREAM DATA PROCESSING SYSTEM

(71) Applicant: Hitachi, Ltd., Tokyo (JP)

(72) Inventors: Tsukasa Hosoya, Tokyo (JP); Satoru Anan, Tokyo (JP)

(73) Assignee: HITACHI, LTD., Tokyo (JP)

( * ) Notice: Subject to any disclaimer, the term of this patent is extended or adjusted under 35 U.S.C. 154(b) by 324 days.

(21) Appl. No.: 15/752,338

(22) PCT Filed: Mar. 28, 2016

(86) PCT No.: PCT/JP2016/059834
§ 371 (c)(1),
(2) Date: Feb. 13, 2018

(87) PCT Pub. No.: WO2017/168497
PCT Pub. Date: Oct. 5, 2017

(65) Prior Publication Data
US 2019/0391981 A1 Dec. 26, 2019

(51) Int. Cl.
*G06F 16/245* (2019.01)
*G06F 16/2455* (2019.01)
*G06F 16/2458* (2019.01)
*G06F 16/901* (2019.01)

(52) U.S. Cl.
CPC .... *G06F 16/24568* (2019.01); *G06F 16/2471* (2019.01); *G06F 16/2477* (2019.01); *G06F 16/9024* (2019.01)

(58) Field of Classification Search
CPC .......... G06F 16/24568; G06F 16/2471; G06F 16/2477; G06F 16/9024

USPC ....................... 707/736, 752, 770
See application file for complete search history.

(56) References Cited

U.S. PATENT DOCUMENTS 7,984,043 B1* 7/2011 Waas ................ G06F 16/8358
707/718
2011/0093491 A1 4/2011 Zabback et al.
2016/0070761 A1* 3/2016 Viel ................. G06F 16/24532
707/713

OTHER PUBLICATIONS

International Search Report of PCT/JP2016/059834 dated Jun. 21, 2016.

* cited by examiner

*Primary Examiner* — Hares Jami
(74) *Attorney, Agent, or Firm* — Mattingly & Malur, PC

(57) ABSTRACT

A computer system has a plurality of computers each executing stream data processing and a management computer assigning a plurality of divided queries to the plurality of computers. The management computer includes a parameter input module configured to receive an analysis scenario including a plurality of queries and division information for dividing the analysis scenario into the plurality of divided queries; and a query analysis module configured to analyze the analysis scenario to generate a query graph. The query analysis module specifies, based on the analysis scenario and the division information, at least one of the divided queries that requires flow control; and sets the flow control for the plurality of computers to each of which the at least one of the divided queries that requires the flow control is to be assigned.

13 Claims, 11 Drawing Sheets

QUERY GRAPH MANAGEMENT INFORMATION 400

| NODE ID | COUPLED NODE ID |
|---|---|
| Q1 | Q2 |
| Q2 | Q5 |
| Q3 | Q4 |
| Q4 | Q5 |
| Q5 | Q6 |
| Q6 | - |

*FIG. 4*

DIVIDED QUERY MANAGEMENT INFORMATION 500

| DIVIDED QUERY ID | NODE ID | COUPLED DIVIDED QUERY ID | FLOW CONTROL FLAG |
|---|---|---|---|
| 1 | Q1,Q2 | 3 | ON |
| 2 | Q3,Q4 | 3 | ON |
| 3 | Q5 | 4 | ON |
| 4 | Q6 | - | - |

*FIG. 5*

```
//option cluster begin
register query Q1 istream (select id, val from [now]);
//option cluster end //option cluster begin
register query Q2 istream
 (select id, sum(val) from Q1 [partition by id rows 3] group by id);
//option cluster end
```

*FIG. 6*

OPERATOR TYPE INFORMATION 215

| OPERATOR TYPE | FLOW CONTROL | GROUPING |
|---|---|---|
| Join | REQUIRED | NO |
| Group by | REQUIRED | YES |
| Selection | NOT REQUIRED | NO |
| ⋮ | ⋮ | ⋮ |

*FIG. 7*

PATH INFORMATION 216

| QUERY ID | GROUPING KEY | INDEPENDENCE |
|---|---|---|
| Q1 | ID | YES |
| Q2 | ID | YES |
| Q3 | ID | NO |
| ⋮ | ⋮ | ⋮ |

*FIG. 8*

```
//option cluster begin
register query Q1 istream (select id, val from [now]);
//option cluster end //option cluster begin, NODEPENDENCY(Q1.ID)
register query Q2 istream
  (select id, sum(val) from Q1 [partition by id rows 3] group by id);
//option cluster end
```

*FIG. 9*

COMPUTER SYSTEM AND METHOD FOR SETTING A STREAM DATA PROCESSING SYSTEM

BACKGROUND OF THE INVENTION

This invention relates to a method of setting a distributed stream data processing system into which flow control is incorporated.

In recent years, a stream data processing system capable of summing up and analyzing data in real time has been attracting attention. The term "stream data" used herein refers to a sequence of pieces of data that continuously arrive. In the IoT era, the distributed stream data processing system is expected to be used in order to analyze data obtained from various apparatus for the purpose of system improvement or the like.

In the distributed stream data processing system, a plurality of queries that form analysis processing or the like are arranged in a plurality of computers, and the queries are executed by each of the computers. A generation order of pieces of data and a reception order of the pieces of data may fail to match each other depending on the coupling relationship in a network, the arrangement of the computers, or the like.

The plurality of queries to be executed include a query required to process pieces of data in a time-series order. In a case where the generation order of the pieces of data and the reception order of the pieces of data differ from each other, an incorrect processing result is output. Therefore, in order to guarantee the consistency of processing results, it is required to provide a system for achieving consistency between the generation order of the pieces of data and the reception order of the pieces of data.

As means for achieving the above-mentioned system, there is known a technology described in, for example, US 2011/0093491 A1. As described in US 2011/0093491 A1, in regard to summation processing that can be partitioned in units of groups, an execution module partitions the summation processing based on tuple times, and uses the partitioned times as summation processing times to be used by a computer in the subsequent stage.

SUMMARY OF THE INVENTION

The technology described in US 2011/0093491 A1 is limited to the summation processing, and when the partitioned times have a granularity finer than a delay time in communication, a mismatch occurs between the generation order of the pieces of data and the reception order of the pieces of data. Further, the technology described in US 2011/0093491 A1 is not premised on adaptation to the distributed stream data processing system.

Therefore, hitherto, administrators or other such persons have been required to develop software configured to receive queries and data for achieving the consistency between the generation order of the pieces of data and the reception order of the pieces of data in consideration of the delay time in communication, coupling between respective queries, a relationship between pieces of data to be input and output, and the like in order to resolve the mismatch between the generation order of the pieces of data and the reception order of the pieces of data. This raises a problem in that cost required for setting the distributed stream processing system becomes higher.

This invention provides a system and method for easily achieving the setting of a distributed stream data processing system with the consistency of processing results being maintained.

The present invention can be appreciated by the description which follows in conjunction with the following figures, wherein: a computer system, comprises a plurality of computers each configured to execute stream data processing; and a management computer configured to assign a plurality of divided queries including at least one query to the plurality of computers. The plurality of computers each has a first processor, a first memory coupled to the first processor, and a first interface coupled to the first processor, for coupling to an external apparatus. The management computer has a second processor, a second memory coupled to the second processor; and a second interface coupled to the second processor, for coupling to an external apparatus. The management computer includes a parameter input module configured to receive: an analysis scenario including a plurality of queries for achieving the stream data processing; and division information for dividing the analysis scenario into the plurality of divided queries, and a query analysis module configured to analyze the analysis scenario, to thereby generate a query graph for indicating a structure of the plurality of queries included in the analysis scenario. The query analysis module is configured to: specify, based on the analysis scenario and the division information, at least one of the plurality of divided queries that requires flow control for achieving consistency between a generation order of pieces of data to be processed by the at least one query and a reception order of the pieces of data; and set the flow control for the plurality of computers to each of which the at least one of the plurality of divided queries that requires the flow control is to be assigned in a case where the at least one of the plurality of divided queries that requires the flow control is to be assigned to each of the plurality of computers.

According to this invention, the management computer can set the distributed stream data processing system with the consistency of processing results of queries being guaranteed based on input information. Problems, configurations, and effects other than described above will become apparent from a description of an embodiment below.

BRIEF DESCRIPTION OF THE DRAWINGS

The present invention can be appreciated by the description which follows in conjunction with the following figures, wherein:

FIG. 4 is a diagram for showing an example of query graph management information in the first embodiment, FIG. 5 is a diagram for showing an example of divided query management information in the first embodiment, FIG. 6 is a diagram for illustrating an example of an analysis scenario including division information in the first embodiment, FIG. 7 is a diagram for showing an example of operator type information in the first embodiment, FIG. 8 is a diagram for showing an example of path information in the first embodiment, FIG. 9 is a diagram for illustrating an example of the analysis scenario including the path information in the first embodiment.

DETAILED DESCRIPTION OF THE PREFERRED EMBODIMENTS

Now, embodiments of this invention are described in detail with reference to the drawings.

First Embodiment

Figure 1:
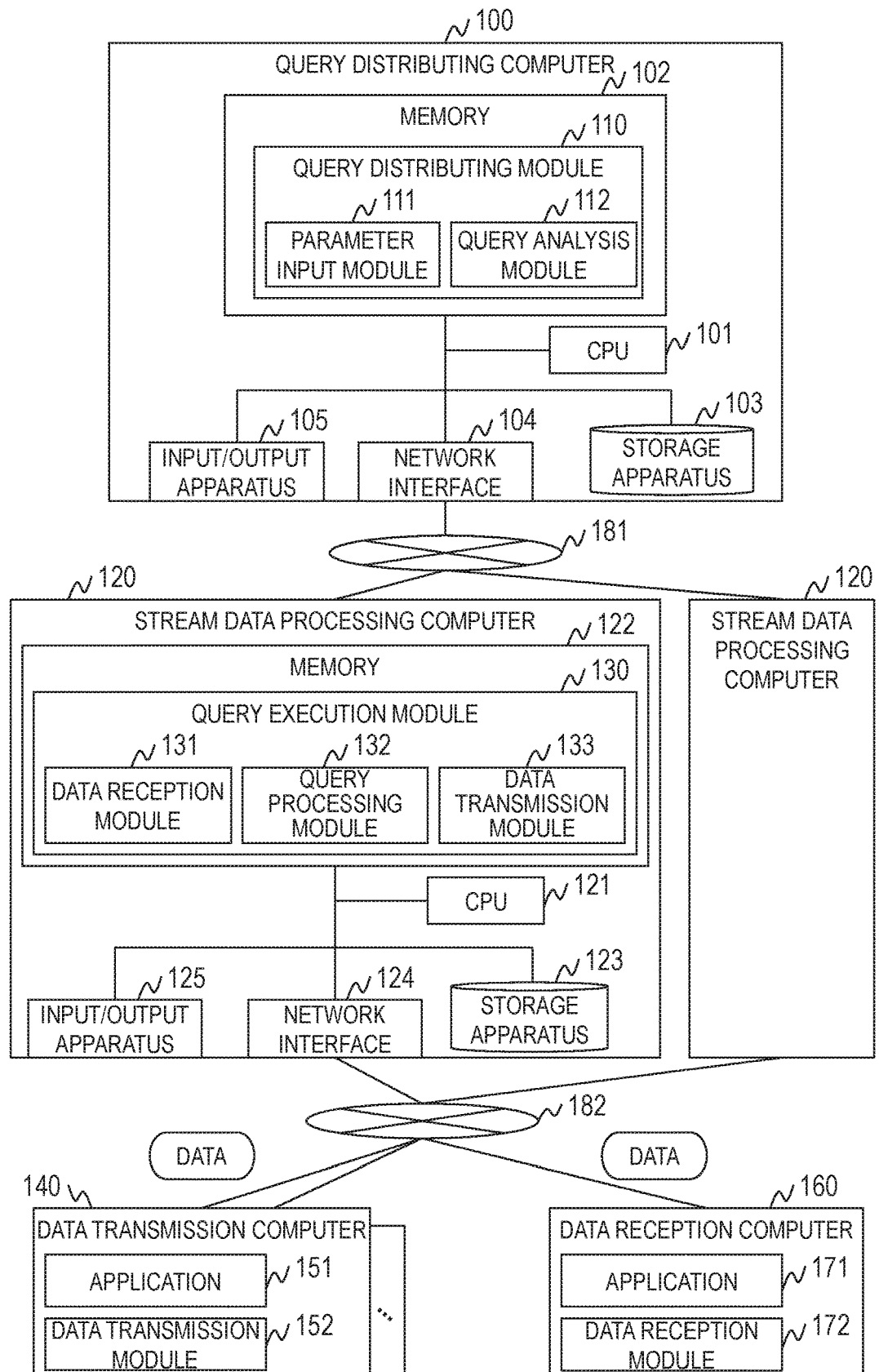
FIG. 1 is a diagram for illustrating an example of a configuration of a computer system according to a first embodiment of this invention.

FIG. 1 is a diagram for illustrating an example of a configuration of a computer system according to a first embodiment of this invention.

The computer system of according to the first embodiment includes a query distributing computer 100, a plurality of stream data processing computers 120, a plurality of data transmission computers 140, and a data reception computer 160. In the first embodiment, the plurality of stream data processing computers 120 are used to build a distributed stream data processing system. There may be provided a plurality of data reception computers 160.

The query distributing computer 100 is coupled to the plurality of stream data processing computers 120 through a network 181. Meanwhile, the plurality of data transmission computers 140 and the data reception computer 160 are coupled to the plurality of stream data processing computers 120 through a network 182. In the first embodiment, there are no limitations imposed on the type of each of the networks 181 and 182. As each of the networks 181 and 182, a wide area network (WAN), a local area network (LAN), or the like is conceivable. Further, in the first embodiment, there are no limitations imposed on the form of coupling between each apparatus and the networks 181 and 182, which may be any one of wireless and wired forms.

Figure 2:
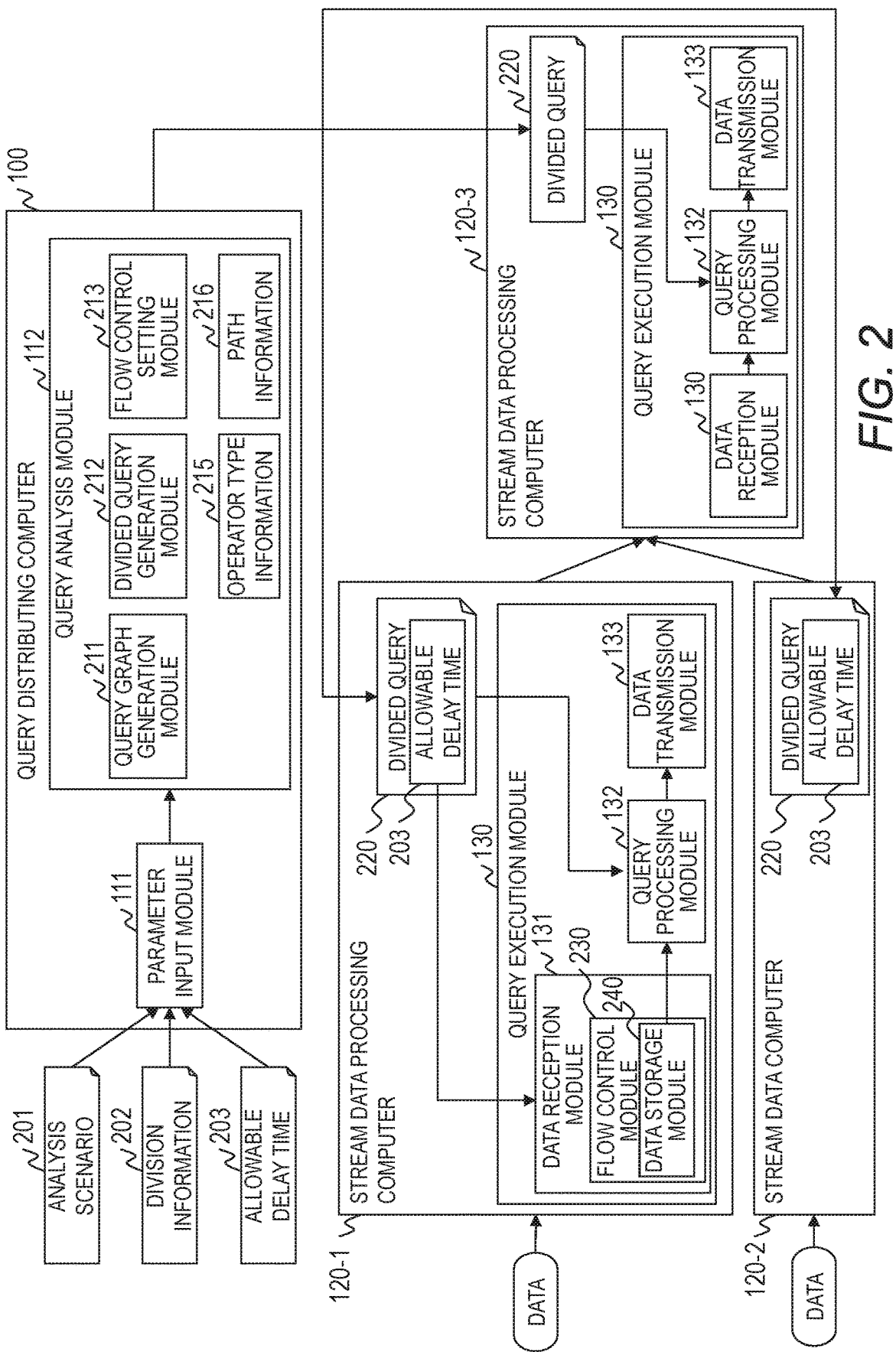
FIG. 2 is a diagram for illustrating an example of the software configurations of a query distributing computer and stream data processing computer in the first embodiment.
Figure 3:
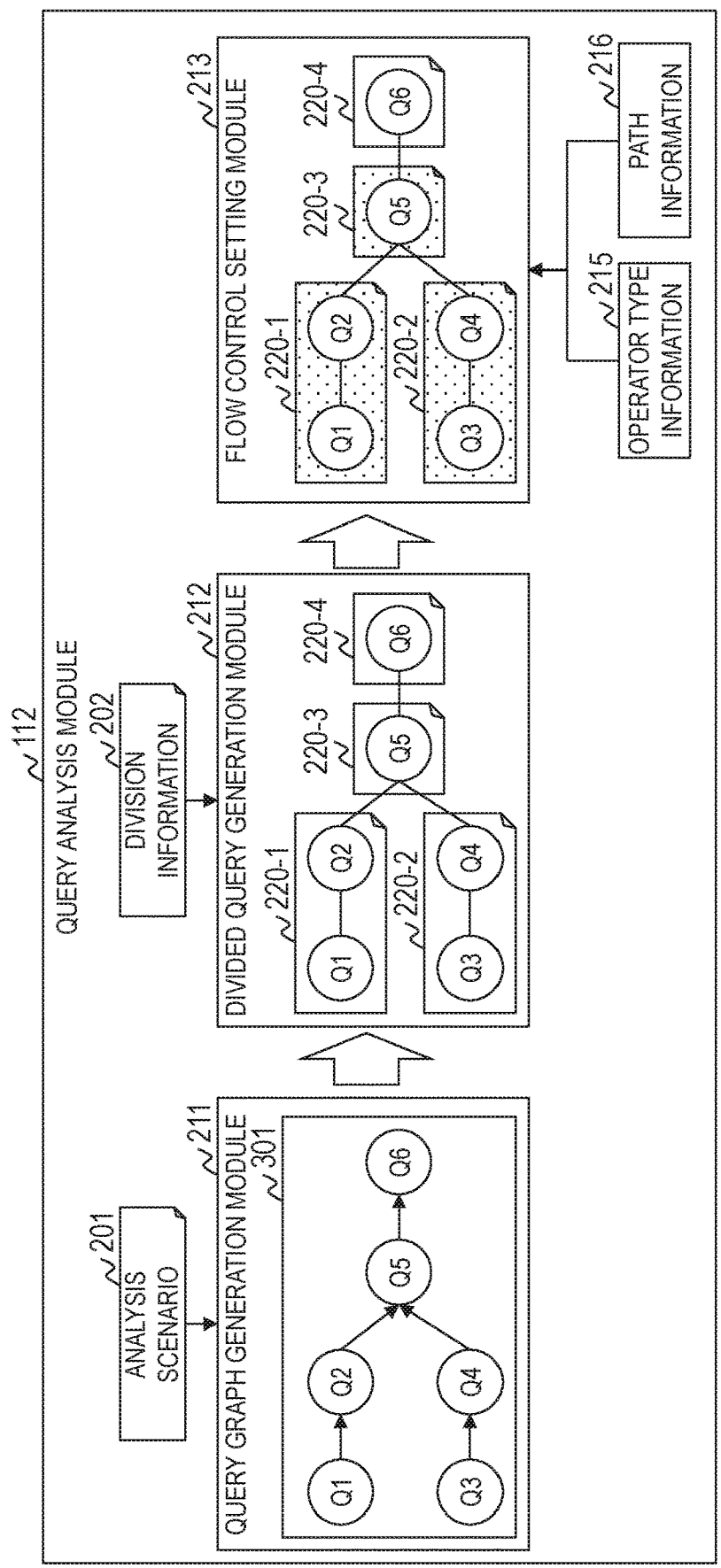
FIG. 3 is a diagram for illustrating a flow of processing performed by a query analysis module in the first embodiment.

The query distributing computer 100 receives an analysis scenario 201 illustrated in FIG. 2, and generates a query graph 301 formed of a plurality of queries, which is illustrated in FIG. 3, based on the analysis scenario 201. The query distributing computer 100 further generates a plurality of divided queries 220, which are illustrated in FIG. 2, by dividing the query graph 301, and assigns the plurality of divided queries 220 to the plurality of stream data processing computers 120.

The term "divided query 220" used herein refers to a query group generated by dividing the query graph 301 generated based on the analysis scenario 201. The divided query 220 includes at least one query.

The query distributing computer 100 includes, as hardware components, a CPU 101, a memory 102, a storage apparatus 103, a network interface 104, and an input/output apparatus 105. The query distributing computer 100 may not include the storage apparatus 103 and the input/output apparatus 105.

The CPU 101 is an arithmetic unit configured to execute a program stored in the memory 102. The CPU 101 executes the program, to thereby implement functions included in the query distributing computer 100. In the following description, a case in which processing is described as being performed by a functional module indicates that a program for implementing the relevant functional module is being executed by the CPU 101.

The memory 102 is a storage medium configured to store a program to be executed by the CPU 101 and information to be used by the program. The program and the information stored in the memory 102 are described later. The storage apparatus 103 is a storage medium configured to store a program and information. Conceivable examples of the storage medium to be used as the storage apparatus 103 include a hard disk drive (HDD) and a solid-state drive (SSD). In the first embodiment, there are no limitations imposed on the type of the storage medium.

The network interface 104 is an interface for coupling to another apparatus through a network. The input/output apparatus 105 is an interface for inputting various kinds of data to the query distributing computer 100 and outputting a processing result and the like. The input/output apparatus 105 includes a keyboard, a mouse, a touch panel, and a display.

Now, the program stored in the memory 102 is described. The memory 102 stores programs for implementing a parameter input module 111 and a query analysis module 112.

The parameter input module 111 receives various parameters and various kinds of information for the query distributing computer 100. The query analysis module 112 analyzes the analysis scenario 201 illustrated in FIG. 2, and assigns the divided query 220 illustrated in FIG. 2.

The query analysis module 112 in the first embodiment is configured, as its feature, to specify the divided query 220 that requires flow control. The term "flow control" used herein refers to control for achieving consistency of a generation order of pieces of data and a reception order of the pieces of data. This allows the consistency of processing results to be guaranteed.

A software configuration of the query distributing computer 100 is described later in detail with reference to FIG. 2 and FIG. 3.

The stream data processing computer 120 receives data (stream data) transmitted from the data transmission computer 140, and processes the data based on the divided query 220 assigned to the stream data processing computer 120. The stream data processing computer 120 outputs the processing result to another stream data processing computer 120 or the data reception computer 160.

The data received by the stream data processing computer 120 is assumed to include a timestamp.

The stream data processing computer 120 includes, as hardware components, a CPU 121, a memory 122, a storage apparatus 123, a network interface 124, and an input/output apparatus 125.

The CPU 121, the memory 122, the storage apparatus 123, the network interface 124, and the input/output apparatus 125 are the same as the CPU 101, the memory 102, the storage apparatus 103, the network interface 104, and the input/output apparatus 105, respectively, and hence descriptions thereof are omitted.

The memory 122 stores a program for implementing a query execution module 130. The query execution module 130 processes the data received from the data transmission computer 140 or another stream data processing computer 120 based on the divided query 220. The query execution module 130 is formed of a plurality of program modules. Specifically, the query execution module 130 includes a data reception module 131, a query processing module 132, and a data transmission module 133.

The data reception module 131 executes reception processing for the data transmitted from the data transmission computer 140 or another stream data processing computer 120. The query processing module 132 processes the received data based on the divided query 220. The data transmission module 133 executes transmission processing for the data including the processing result output from the query processing module 132.

A software configuration of the stream data processing computer 120 is described later in detail with reference to FIG. 2.

The data transmission computer 140 transmits data to be processed by the stream data processing computer 120. Conceivable examples of the data transmission computer 140 include a computer configured to manage a sensor at a factory. The sensor itself may serve as the data transmission computer 140.

The data transmission computer 140 includes a CPU (not shown), a memory (not shown), and a network interface (not shown). An application 151 and a data transmission module 152 operate on the data transmission computer 140. In the first embodiment, there are no limitations imposed on the type of the application 151. The data transmission module 152 executes transmission processing for a value obtained by the application 151 or data indicating a behavior or the like of the application 151.

The data reception computer 160 receives the data processed by the stream data processing computer 120. The data reception computer 160 includes a CPU (not shown), a memory (not shown), and a network interface (not shown). An application 171 and a data reception module 172 operate on the data reception computer 160. In the first embodiment, there are no limitations imposed on the type of the application 171. The data reception module 172 executes reception processing for the data.

Any one of the data transmission computer 140 and the data reception computer 160 may include a query distributing module 110.

In FIG. 1, physical computers are used to implement the query distributing computer 100 and the stream data processing computer 120, but this invention is not limited thereto. For example, a virtual machine generated through use of a virtualization technology may be used to implement the query distributing computer 100 and the stream data processing computer 120.

FIG. 2 is a diagram for illustrating an example of the software configurations of the query distributing computer 100 and the stream data processing computer 120 in the first embodiment.

First, a description is given of input and output of data to/from the stream data processing computer 120 illustrated in FIG. 2. A stream data processing computer 120-1 and a stream data processing computer 120-2 each receive data from the data transmission computer 140, and process the received data based on the divided query 220. The stream data processing computer 120-1 and the stream data processing computer 120-2 output the processing results to a stream data processing computer 120-3. Meanwhile, the stream data processing computer 120-3 receives data from each of the stream data processing computer 120-1 and the stream data processing computer 120-2, and processes the received data based on the divided query 220. The stream data processing computer 120-3 outputs the processing result to the data reception computer 160.

Next, the information to be input to the query distributing computer 100 and the software configuration of the query distributing computer 100 are described.

The analysis scenario 201, division information 202, and an allowable delay time 203 are input to the query distributing computer 100.

The analysis scenario 201 includes a plurality of queries. The query includes at least one operator. The operator represents a minimum unit of processing within stream data processing. The operator corresponds to, for example, data extraction processing and data aggregation processing.

The division information 202 is information for dividing the analysis scenario 201. The division information 202 includes information indicating a division position between the plurality of queries included in the query graph 301 illustrated in FIG. 3. In the first embodiment, the analysis scenario 201 is assumed to include the division information 202. The division information 202 is described later in detail with reference to FIG. 6.

The allowable delay time 203 is a value for specifying a period for use in the flow control. As described later, a flow control module 230 uses the allowable delay time 203 to execute the flow control.

The query analysis module 112 includes a query graph generation module 211, a divided query generation module 212, and a flow control setting module 213, and holds operator type information 215 and path information 216.

The query graph generation module 211 generates the query graph 301 from the analysis scenario 201. The divided query generation module 212 specifies a division position within the query graph 301 based on the division information 202, and divides the query graph 301 based on the specified division position, to thereby generate the divided queries 220. The flow control setting module 213 specifies the divided query 220 that requires the flow control.

The operator type information 215 is information for managing whether the flow control is required for an operator. The operator type information 215 is described later in detail with reference to FIG. 7. The path information 216 is information for managing a path for aggregated data, which is aggregating based on arbitrary identification information, and is to be input to a query. The path information 216 is described later in detail with reference to FIG. 8.

The query analysis module 112 determines the stream data processing computer 120 to which the divided query 220 is to be assigned, and assigns the divided query 220 to the determined stream data processing computer 120. Specifically, the following processing is executed.

In a case where the divided query 220 does not require the flow control, the query analysis module 112 assigns the divided query 220 to the stream data processing computer 120. In a case where the divided query 220 requires the flow control, the query analysis module 112 assigns the divided query 220 including the allowable delay time 203 to the stream data processing computer 120, and further sets the flow control module 230 for the stream data processing computer 120.

Next, the software configuration of the stream data processing computer 120 is described. The stream data processing computer 120-1 and the stream data processing computer 120-2 are each the stream data processing computer 120 to which the divided query 220 that requires the flow control is assigned. The stream data processing computer 120-3 is the stream data processing computer 120 to which the divided query 220 that does not require the flow control is assigned.

The data reception module 131 of each of the stream data processing computer 120-1 and the stream data processing computer 120-2 includes the flow control module 230 configured to execute the flow control. The flow control module 230 includes a data storage module 240. The data storage module 240 temporarily stores the received data.

Meanwhile, the data reception module 131 of the stream data processing computer 120-3 does not include the flow control module 230.

In a case of receiving data, the data reception module 131 including the flow control module 230 executes the flow control based on the allowable delay time 203, and outputs the data that has been subjected to the flow control to the query processing module 132. On the other hand, in a case of receiving data, the data reception module 131 that does not include the flow control module 230 outputs the received data to the query processing module 132 as it is.

The query processing module 132 uses the data input from the data reception module 131 to execute the query included in the divided query 220 based on the divided query 220, and outputs the data including the processing result to the data transmission module 133.

The data transmission module 133 transmits the data including the processing result to another stream data processing computer 120 or the data reception computer 160.

Next, a description is given of a function of the query analysis module 112.

FIG. 3 is a diagram for illustrating a flow of processing performed by the query analysis module 112 in the first embodiment. FIG. 4 is a diagram for showing an example of query graph management information in the first embodiment. FIG. 5 is a diagram for showing an example of divided query management information in the first embodiment. FIG. 6 is a diagram for illustrating an example of the analysis scenario 201 including the division information 202 in the first embodiment. FIG. 7 is a diagram for showing an example of the operator type information 215 in the first embodiment. FIG. 8 is a diagram for showing an example of the path information 216 in the first embodiment. FIG. 9 is a diagram for illustrating an example of the analysis scenario 201 including the path information 216 in the first embodiment.

A description is given of the query graph generation module 211. The query graph generation module 211 generates the query graph 301 through use of the analysis scenario 201 as the input. As illustrated in FIG. 3, the query graph 301 is data having a tree structure, and the query corresponds to a node. The query graph 301 illustrated in FIG. 3 indicates that the queries are executed in an order from a query Q1 and a query Q3 to a query Q6.

The query graph generation module 211 in the first embodiment generates query graph management information 400 shown in FIG. 4. The query graph management information 400 is information for managing the query graph 301, and includes a plurality of entries formed of a node ID 401 and a coupled node ID 402.

The node ID 401 is identification information on a query. The coupled node ID 402 is identification information on a node (query) to which data on the query corresponding to the node ID 401 is to be output.

The query graph generation module 211 may not necessarily generate the query graph management information 400. For example, the query graph generation module 211 embeds pointers or the like for recognizing coupling between queries into the analysis scenario 201.

A description is given of the divided query generation module 212. The divided query generation module 212 specifies the division position within the query graph 301 through use of the division information 202 and the query graph 301 as the input, and divides the query graph 301 based on the specified division positions, to thereby generate the plurality of divided queries 220.

The analysis scenario 201 illustrated in FIG. 6 includes the division information 202. Specifically, it is indicated that queries each contained between the line "/ /option cluster begin" and the line "/ /option cluster end" are queries that form the divided query 220. In this case, the divided query generation module 212 determines that a position between the line "/ /option cluster end" and the following line "/ /option cluster begin" is a division position.

The divided query generation module 212 in the first embodiment generates divided query management information 500 shown in FIG. 5. The divided query management information 500 is information for managing the divided query 220, and includes a divided query ID 501, a node ID 502, a coupled divided query ID 503, and a flow control flag 504.

The divided query ID 501 is identification information on the divided query 220. The node ID 502 is the identification information on a query included in the divided query 220. The coupled divided query ID 503 is identification information on the divided query 220 to which data on the divided query 220 corresponding to the divided query ID 501 is to be output. The flow control flag 504 is a flag indicating whether or not the divided query 220 requires the flow control. The flow control flag 504 is assumed to have an initial value being blank. In a case where it is determined that the divided query 220 requires the flow control, the flow control flag 504 is set to store a value of "ON".

A description is given of the flow control setting module 213. The flow control setting module 213 specifies the divided query 220 that requires the flow control based on a result of dividing the query graph 301. In FIG. 3, it is indicated that a divided query 220-1, a divided query 220-2, and a divided query 220-3 are determined as the divided queries 220 that require the flow control.

The flow control setting module 213 in the first embodiment specifies the divided query 220 that requires the flow control based on the result of divided the query graph 301. The flow control setting module 213 in a second embodiment of this invention specifies the divided query 220 that requires the flow control based on the result of dividing the query graph 301 and the operator type information 215. The flow control setting module 213 in a third embodiment of this invention specifies the divided query 220 that requires the flow control based on the result of dividing the query graph 301, the operator type information 215, and the path information 216.

Next, the operator type information 215 and the path information 216 are described.

The operator type information 215 includes an operator type 701, flow control 702, and grouping 703.

The operator type 701 is identification information on an operator. The operator itself may be stored in the operator type 701. The flow control 702 is a flag indicating whether or not the flow control is required. The grouping 703 is a flag indicating whether or not the operator is to be grouped, and is also used as a flag indicating whether or not the path information 216 is to be referred to. In a case where the operator is to be grouped, "YES" is stored in the grouping 703, and in a case where the operator is not to be grouped, "NO" is stored in the grouping 703.

The path information 216 includes a query ID 801, a grouping key 802, and independence 803.

The query ID 801 is the identification information on a query, and the same identification information as the node ID 401 is stored therein. The grouping key 802 is information on a key to be used for grouping. The independence 803 is a flag indicating whether or not the grouped data has independence.

In a case where the grouped data to be input to the query corresponding to the query ID 801 has independence, "YES" is stored in the independence 803. In a case where the grouped data to be input to the query corresponding to the query ID 801 has no independence, "NO" is stored in the independence 803.

In a case where there exists one input path for aggregation data aggregated with the same identification information, the aggregation data has independence. Meanwhile, in a case where there exists a plurality of input paths for aggregation data aggregated with the same identification information, the aggregation data has no independence.

As illustrated in FIG. 9, the analysis scenario 201 may include the path information 216. In FIG. 9, the bold text part indicates that data grouped by the ID, which is to be input from the query Q1 to a query Q2, has independence.

Figure 10:
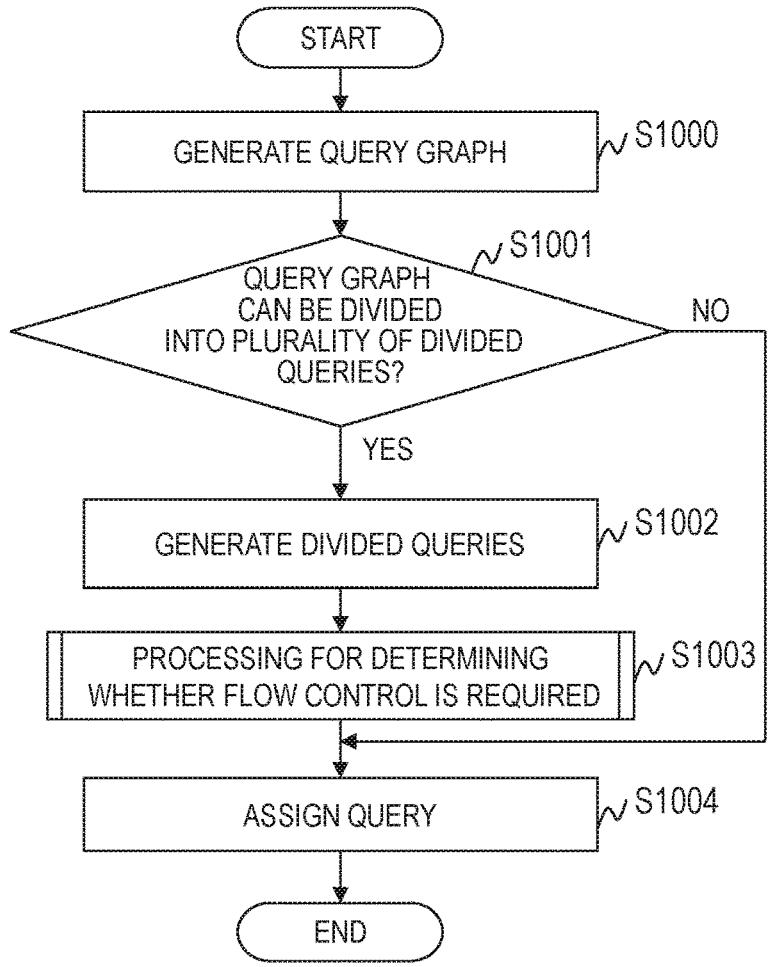
FIG. 10 is a flowchart for illustrating an example of processing executed by the query analysis module in the first embodiment.
Figure 11:
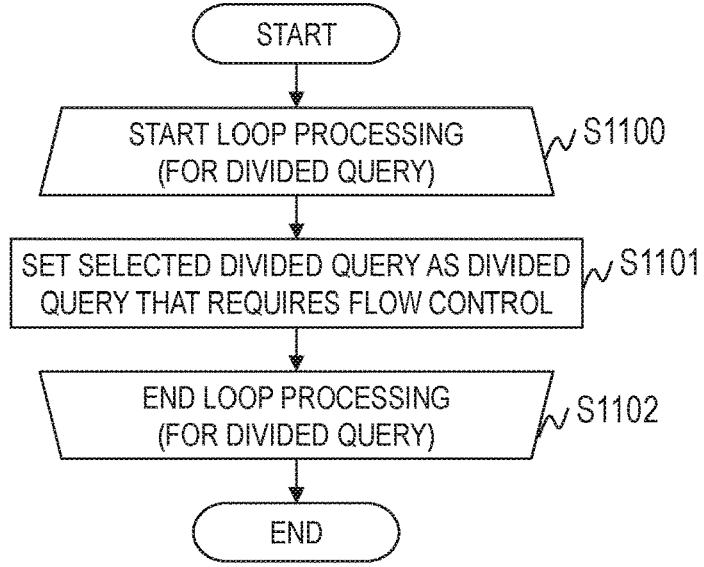
FIG. 11 is a flowchart for illustrating an example of processing for determining whether the flow control is required in the first embodiment.

Next, with reference to FIG. 10 and FIG. 11, processing executed by the query distributing computer 100 is described in detail.

FIG. 10 is a flowchart for illustrating an example of processing executed by the query analysis module 112 in the first embodiment.

In a case where the analysis scenario 201 is input, the query analysis module 112 starts processing described as follows.

First, the query analysis module 112 generates the query graph 301 based on the analysis scenario 201 (Step S1000).

Specifically, the query graph generation module 211 generates the query graph 301 based on the analysis scenario 201. At this time, the query graph generation module 211 generates the query graph management information 400. A known technology is used as a method of generating the query graph 301, and hence a description thereof is omitted.

Subsequently, the query analysis module 112 determines whether or not the query graph 301 can be divided into a plurality of divided queries 220 (Step S1001).

Specifically, the divided query generation module 212 determines whether the division information 202 has been input. In a case where the division information 202 has not been input, the divided query generation module 212 determines that the query graph 301 cannot be divided into a plurality of divided queries 220.

In a case where it is determined that the query graph 301 cannot be divided into a plurality of divided queries 220, the query analysis module 112 assigns the query to the stream data processing computer 120 (Step S1004). After that, the query analysis module 112 brings the processing to an end.

Specifically, the query analysis module 112 assigns all the queries included in the query graph 301 to one of the stream data processing computers 120.

In a case where it is determined that the query graph 301 can be divided into a plurality of divided queries 220, the query analysis module 112 generates the plurality of divided queries 220 based on the division information 202 (Step S1002).

Specifically, the divided query generation module 212 specifies the division position within the query graph 301 based on the division information 202, and divides the query graph 301 based on the specified division positions, to thereby generate a plurality of divided queries 220. At this time, the divided query generation module 212 generates the divided query management information 500 based on the result of dividing the query graph 301. At this time point, the flow control flags 504 of all the entries within the divided query management information 500 are blank.

Subsequently, the query analysis module 112 executes processing for determining whether the flow control is required (Step S1003). In the processing for determining whether the flow control is required, the divided query 220 that requires the flow control is specified. The processing for determining whether the flow control is required is described later in detail with reference to FIG. 11.

Subsequently, the query analysis module 112 assigns the query to the stream data processing computer 120 based on the processing result of the processing for determining whether the flow control is required (Step S1004). After that, the query analysis module 112 brings the processing to an end. Specifically, the following processing is executed.

The query analysis module 112 determines the stream data processing computer 120 to which each of the plurality of divided queries 220 is to be assigned. The query analysis module 112 refers to the flow control flag 504 within the divided query management information 500 to determine whether the divided query 220 requires the flow control.

In a case where the flow control flag 504 is blank, the query analysis module 112 assigns the divided query 220 to the stream data processing computer 120. In a case where the flow control flag 504 is set to "ON", the query analysis module 112 assigns the divided query 220 including the allowable delay time 203 to the stream data processing computer 120, and further sets the flow control module 230 for the stream data processing computer 120. In this case, conceivable examples of a method of setting the flow control module 230 for the stream data processing computer 120 are as follows.

(Setting Method 1) In a case where the data reception module 131 of the stream data processing computer 120 does not include the flow control module 230, the query analysis module 112 adds the flow control module 230 to the data reception module 131. For example, the query analysis module 112 installs a program for implementing the data reception module 131 on the stream data processing computer 120.

(Setting Method 2) In a case where the data reception module 131 of the stream data processing computer 120 includes the flow control module 230 configured to execute the flow control, the query analysis module 112 instructs the stream data processing computer 120 to activate the flow control module 230. The flow control module 230 is assumed to be in an inactive state before the divided query 220 is assigned.

As described above, the query distributing computer 100 sets the flow control module 230 only for the stream data processing computer 120 to which the divided query 220 that requires the flow control is assigned. The processing of Step S1004 is performed in the above-mentioned manner.

FIG. 11 is a flowchart for illustrating an example of the processing for determining whether the flow control is required in the first embodiment.

The flow control setting module 213 starts loop processing for the divided query 220 (Step S1100).

Specifically, the flow control setting module 213 refers to the divided query management information 500 to select a target divided query 220. In the first embodiment, the divided queries 220 are assumed to be selected in a direction from the divided query 220 at the last end of data output to the divided query 220 at the input end. For example, in the case of the query graph 301 illustrated in FIG. 3, a divided query 220-4 is selected first, the divided query 220-3 is then selected, and the divided query 220-1 or the divided query 220-2 is then selected.

The flow control setting module 213 specifies the selected divided query 220 as the divided query 220 that requires the flow control (Step S1101).

Specifically, the flow control setting module 213 sets "ON" in the flow control flag 504 of an entry corresponding to the selected divided query 220. The flow control setting module 213 adds a flag for instructing the execution of the flow control to the selected divided query 220 as the need arises.

Subsequently, the flow control setting module 213 determines whether the processing has been completed for all the divided queries 220 (Step S1102).

In a case where it is determined that the processing has not been completed for all the divided queries 220, the flow control setting module 213 returns to Step S1100 to execute the same processing.

In a case where it is determined that the processing has been completed for all the divided queries 220, the flow control setting module 213 brings the processing to an end.

In the first embodiment, the query analysis module 112 sets the flow control module 230 for all the stream data processing computers 120 to each of which the divided query 220 is assigned.

Figure 12:
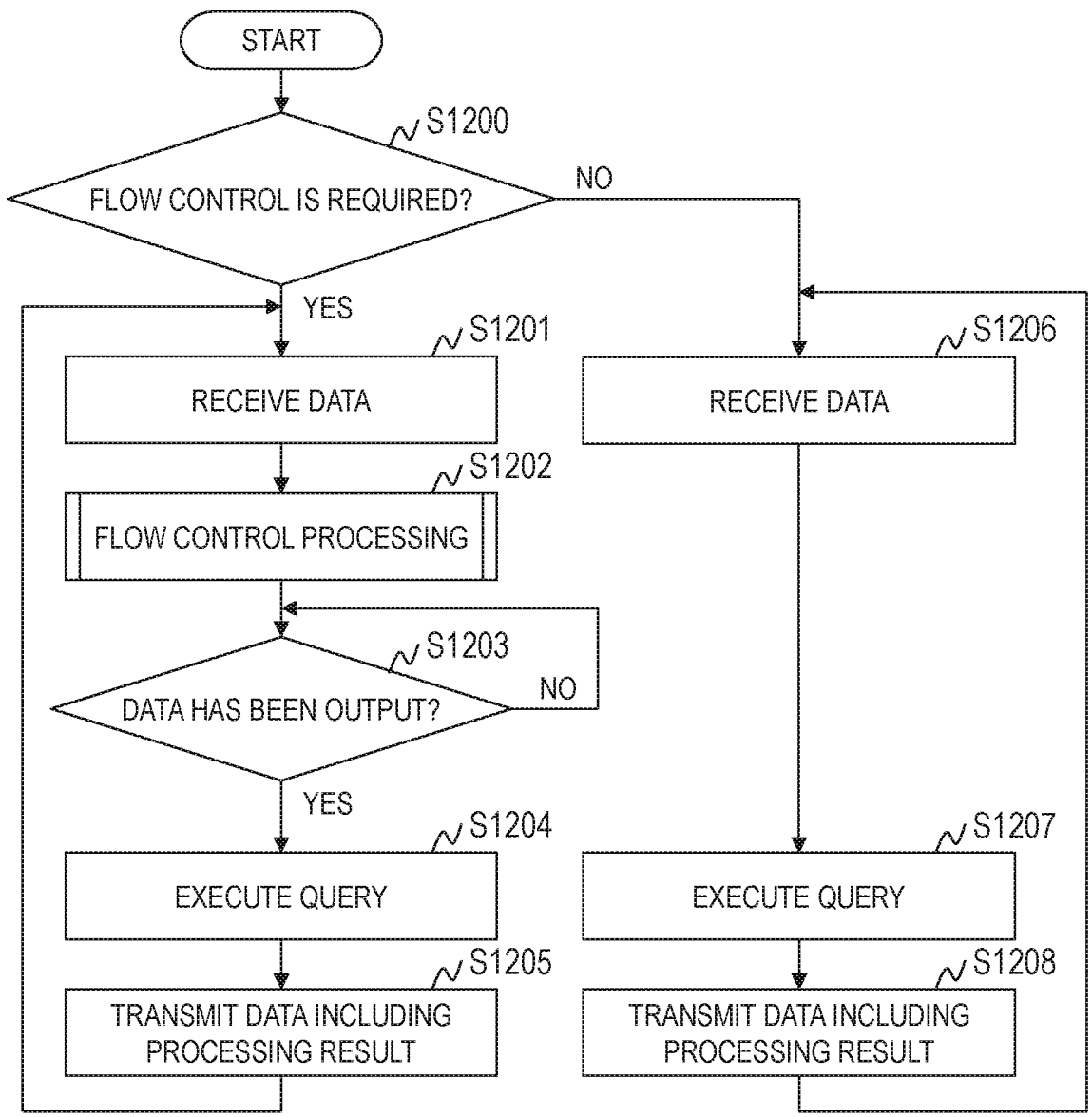
FIG. 12 is a flowchart for illustrating an example of processing executed by a query execution module in the first embodiment.
Figure 13:
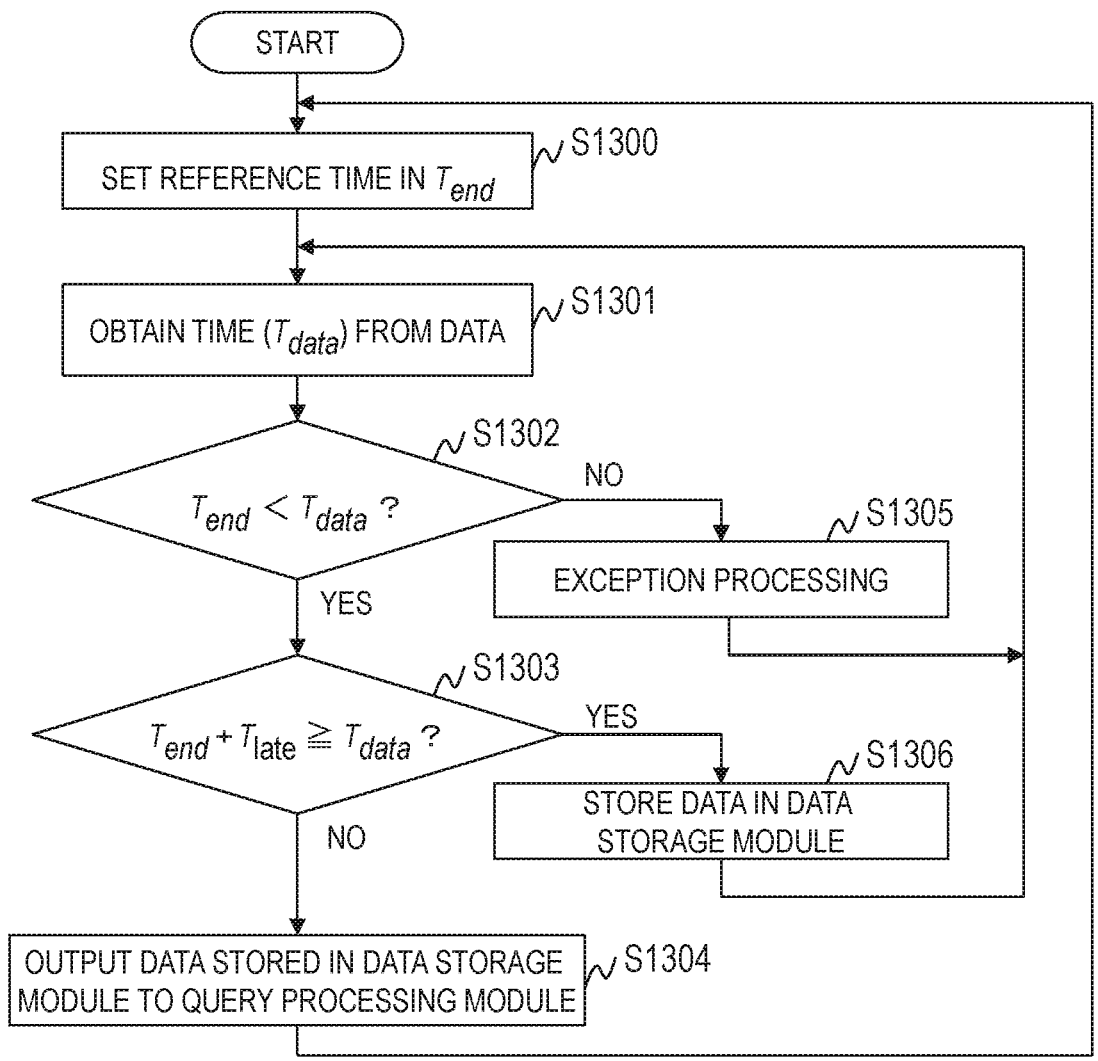
FIG. 13 is a flowchart for illustrating an example of flow control processing executed by a flow control module in the first embodiment.

Next, with reference to FIG. 12 and FIG. 13, processing executed by the stream data processing computer 120 is described in detail.

FIG. 12 is a flowchart for illustrating an example of the processing executed by the query execution module 130 in the first embodiment.

The query execution module 130 determines whether the flow control is required at the execution of the divided query 220 (Step S1200).

Specifically, the query execution module 130 determines whether the divided query 220 includes the flag for instructing the execution of the flow control. The above-mentioned determination method is merely an example, and this invention is not limited thereto. For example, in a case where the divided query 220 and the allowable delay time 203 are received from the query distributing computer 100, the query execution module 130 may determine that the divided query 220 requires the flow control.

In a case where it is determined that the flow control is required at the execution of the divided query 220, the query execution module 130 is kept in a standby state until data is input. In a case where data is received (Step S1201), the query execution module 130 executes flow control processing on the data (Step S1202). Specifically, the data reception module 131 receives data, and calls the flow control module 230. The flow control processing is described later in detail with reference to FIG. 13.

Subsequently, the query execution module 130 determines whether t data subjected to the flow control processing has been output from the data reception module 131 (Step S1203).

Specifically, the query processing module 132 determines whether data has been output from the data reception module 131.

In a case where it is determined that the data subjected to the flow control processing has not been output from the data reception module 131, the query execution module 130 returns to Step S1203 to be kept in a standby state until data is output.

In a case where it is determined that the data subjected to the flow control processing has been output from the data reception module 131, the query execution module 130 executes the query based on the divided query 220 (Step S1204).

Specifically, the query processing module 132 executes the query. In the first embodiment, there are no limitations imposed on the details of the query to be executed.

Subsequently, the query execution module 130 transmits the data including the processing result of the query (Step S1205). After that, the query execution module 130 returns to Step S1201 to execute the same processing. In a case where a predetermined condition is satisfied or in a case where an instruction to end the processing is received, the query execution module 130 brings the processing to an end.

Specifically, the data transmission module 133 transmits the data including the processing result of the query to another stream data processing computer 120 or the data reception computer 160.

In a case where it is determined in Step S1200 that the flow control is not required at the execution of the divided query 220, the query execution module 130 is kept in a standby state until data is input. In a case where data is received (Step S1206), the query execution module 130 executes the query based on the divided query 220 (Step S1207). At this time, the data received by the data reception module 131 is output to the query processing module 132 as it is.

Subsequently, the query execution module 130 transmits the data including the processing result of the query (Step S1208). After that, the query execution module 130 returns to Step S1206 to execute the same processing. In a case where a predetermined condition is satisfied or in a case where an instruction to end the processing is received, the query execution module 130 brings the processing to an end.

FIG. 13 is a flowchart for illustrating an example of the flow control processing executed by the flow control module 230 in the first embodiment.

The flow control module 230 sets a reference time in a variable $T_{end}$ (Step S1300). After that, the flow control module 230 continues to wait for the reception of data. Specifically, the following processing is executed.

When initially activated, the flow control module 230 sets a time at which the data reception module 131 first receives data or a time specified by the query distributing computer 100 or other such external apparatus, in the variable $T_{end}$ as the reference time.

In a case where the processing returns from Step S1304 to Step S1300, the value of the variable $T_{end}$ is updated. Conceivable examples of a method of updating the variable $T_{end}$ are as follows.

(Update Method 1) The flow control module 230 sets a time calculated by adding a predetermined time to the variable $T_{end}$, in the variable $T_{end}$ as a new reference time.

(Update Method 2) In a case where the data reception module 131 newly receives data, the flow control module 230 sets a time of the data in the variable $T_{end}$ as a new reference time.

The time to be added can be specified by the query distributing computer 100 or other such external apparatus. The processing of Step S1300 is performed in the above-mentioned manner.

In a case where the data reception module 131 receives data, the flow control module 230 obtains a time from the data received by the data reception module 131, and sets the obtained time in a variable $T_{data}$ (Step S1301).

Subsequently, the flow control module 230 determines whether Expression (1) is satisfied (Step S1302).

$$T_{end} < T_{data} \tag{1}$$

In a case where it is determined that Expression (1) is satisfied, the flow control module 230 determines whether Expression (2) is satisfied. In Expression (2), a variable $T_{late}$ represents a variable indicating the allowable delay time 203.

$$T_{end} + T_{late} \geq T_{data} \tag{2}$$

In a case where Expression (2) is not satisfied, the flow control module 230 outputs the data stored in the data storage module 240 to the query processing module 132 (Step S1304). After that, the flow control module 230 returns to Step S1300 to execute the same processing.

Specifically, the flow control module 230 sorts pieces of data stored in the data storage module 240 in a time-series order, and outputs the sorted pieces of data to the query processing module 132.

In a case where it is determined in Step S1303 that Expression (2) is satisfied, that is, in a case where the time of the received data is included between $T_{end}$ and ($T_{end}$+ $T_{late}$), the flow control module 230 stores the received data in the data storage module 240 (Step S1306). After that, the flow control module 230 returns to Step S1301 to execute the same processing.

In a case where it is determined in Step S1302 that Expression (1) is not satisfied, the flow control module 230 executes exception processing (Step S1305). After that, the flow control module 230 returns to Step S1301 to execute the same processing.

In the exception processing, the received data is discarded or processing freely specified in advance is executed. In the first embodiment, there are no limitations imposed on the details of the exception processing.

In FIG. 13, when data is to be output, the flow control module 230 changes an output order of pieces of data, but this invention is not limited thereto. For example, the flow control module 230 may change the order of pieces of data when storing the received data in the data storage module 240.

According to the first embodiment, the query distributing computer 100 can automatically set the flow control module 230 in units of the divided queries 220 based on the analysis scenario 201 and the division information 202.

Therefore, an administrator or other such person can easily set the distributed stream data processing system into which the flow control is incorporated without the need to develop software configured to receive queries and data. Further, it is possible to reduce cost required for setting the distributed stream processing system.

Second Embodiment

The second embodiment is different from the first embodiment in that the query analysis module 112 takes the type of operation included in the query into consideration in the processing for determining whether the flow control is required. The following description of the second embodiment is mainly directed to differences from the first embodiment.

A configuration of a computer system according to the second embodiment is the same as that of the computer system according to the first embodiment, and hence a description thereof is omitted. A hardware configuration and a software configuration of the query distributing computer 100 in the second embodiment are the same as those of the query distributing computer 100 in the first embodiment, and hence descriptions thereof are omitted. A hardware configuration and a software configuration of the stream data processing computer 120 in the second embodiment are the same as those of the stream data processing computer 120 in the first embodiment, and hence descriptions thereof are omitted.

Information held in the query distributing computer 100 in the second embodiment is the same as the information held in the query distributing computer 100 in the first embodiment, and hence a description thereof is omitted.

Processing executed by the query analysis module 112 in the second embodiment is the same as the processing executed by the query analysis module 112 in the first embodiment, which is illustrated in FIG. 10, and hence a description thereof is omitted. Processing executed by the query execution module 130 in the second embodiment is the same as the processing executed by the query execution module 130 in the first embodiment, which is illustrated in FIG. 12, and hence a description thereof is omitted. Processing executed by the flow control module 230 in the second embodiment is the same as the processing executed by the flow control module 230 in the first embodiment, which is illustrated in FIG. 13, and hence a description thereof is omitted.

Figure 14:
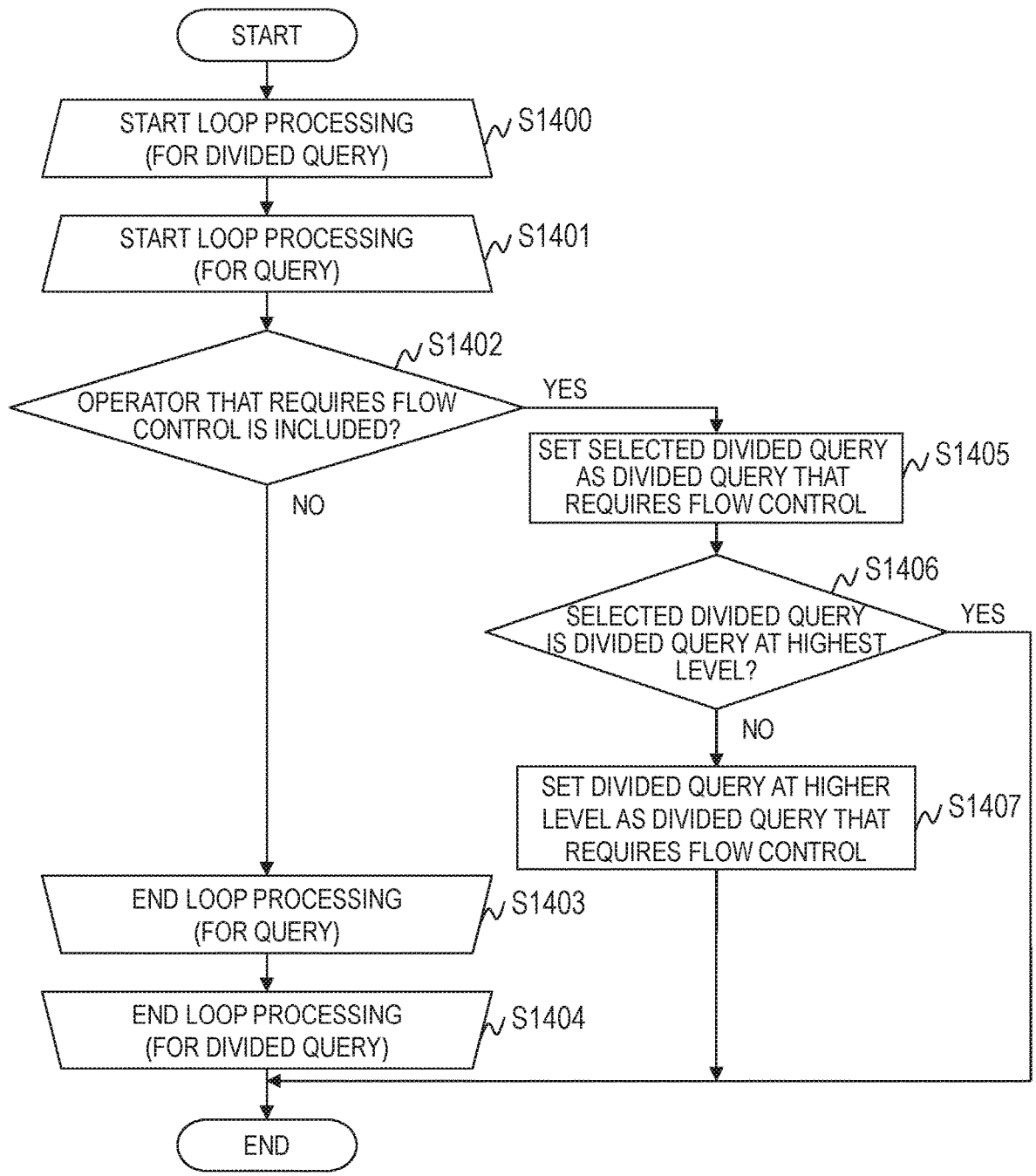
FIG. 14 is a flowchart for illustrating an example of the processing for determining whether the flow control is required in a second embodiment.

In the second embodiment, the processing for determining whether the flow control is required is partially different. FIG. 14 is a flowchart for illustrating an example of the processing for determining whether the flow control is required in the second embodiment.

The flow control setting module 213 starts loop processing for the divided query 220 (Step S1400). The processing of Step S1400 is the same as the processing of Step S1100.

Subsequently, the flow control setting module 213 starts loop processing for the query (Step S1401).

Specifically, the flow control setting module 213 refers to the node ID 502 within the divided query management information 500 to select a target query from among the queries included in the selected divided query 220. In the second embodiment, the flow control setting module 213 is assumed to select the queries in a direction from the query at the output end to the query at the input end. For example, in Step S1400, in a case where the divided query 220-2 illustrated in FIG. 3 is selected, the flow control setting module 213 selects a query Q4, and then selects the query Q3.

Subsequently, the flow control setting module 213 determines whether the selected query includes an operator that requires the flow control (Step S1402). Specifically, the following processing is executed.

The flow control setting module 213 refers to the analysis scenario 201 to specify operators included in the selected query. The flow control setting module 213 selects one of the specified operators, and refers to the operator type information 215 to retrieve an entry corresponding to the selected operator.

The flow control setting module 213 determines whether the flow control 702 of the retrieved entry is "required". In a case where the flow control 702 of the retrieved entry is "required", the flow control setting module 213 determines that the selected query includes an operator that requires the flow control. In a case where the flow control 702 of the retrieved entry is not "required", the flow control setting module 213 executes the same processing on another query as well.

In a case where the flow control 702 of none of the operators included in the selected query is "required", the flow control setting module 213 determines that the selected query does not include the operator that requires the flow control. The processing of Step S1402 is performed in the above-mentioned manner.

In a case where it is determined that the selected query does not include the operator that requires the flow control, the flow control setting module 213 determines whether the processing has been completed for all the queries included in the selected divided query 220 (Step S1403).

In a case where it is determined that the processing has not been completed for all the queries included in the selected divided query 220, the flow control setting module 213 returns to Step S1401 to execute the same processing.

In a case where it is determined that the processing has been completed for all the queries included in the selected divided query 220, the flow control setting module 213 determines whether the processing has been completed for all the divided queries 220 (Step S1404).

In a case where it is determined that the processing has not been completed for all the divided queries 220, the flow control setting module 213 returns to Step S1400 to execute the same processing.

In a case where it is determined that the processing has been completed for all the divided queries 220, the flow control setting module 213 brings the processing to an end.

In a case where it is determined in Step S1402 that the selected query includes the operator that requires the flow control, the flow control setting module 213 specifies the selected divided query 220 as the divided query 220 that requires the flow control (Step S1405). The processing of Step S1405 is the same as the processing of Step S1101.

Subsequently, the flow control setting module 213 determines whether the selected divided query 220 is the divided query 220 at the highest level (Step S1406).

Specifically, the flow control setting module 213 refers to the divided query management information 500 to determine whether the divided query 220 is at the last end of input. More specifically, the flow control setting module 213 determines whether there exists a divided query 220 from which data is to be input to the selected divided query 220. In a case where there exists a divided query 220 from which data is to be input to the selected divided query 220, it is determined that the selected divided query 220 is not the divided query 220 at the highest level.

For example, when the divided query 220-3 within the query graph 301 illustrated in FIG. 3 is the selected divided query 220, each of the divided query 220-1 and the divided query 220-2 is the divided query 220 from which data is to be input to the selected divided query 220.

In a case where it is determined that the selected divided query 220 is the divided query 220 at the highest level, the flow control setting module 213 brings the processing to an end.

In a case where it is determined that the selected divided query 220 is not the divided query 220 at the highest level, the flow control setting module 213 specifies the divided query 220 at a higher level than the level of the selected divided query 220 as the divided query 220 that requires the flow control (Step S1407). After that, the flow control setting module 213 brings the processing to an end.

Specifically, the flow control setting module 213 refers to the divided query management information 500 to specify the divided query 220 at a higher level than the level of the selected divided query 220. In this case, the divided query 220 at a higher level refers to the divided query 220 that satisfies the condition of Step S1406. The flow control setting module 213 sets "ON" in the flow control flag 504 of the entry corresponding to the specified divided query 220.

In FIG. 14, the flow control setting module 213 executes the processing of Step S1402 in units of the divided queries 220 in order to retrieve the divided query 220 including the query including the operator that requires the flow control.

The flow control setting module 213 may omit processing relating to the divided query 220 at the level higher than the level of the divided query 220 that requires the flow control. In other words, the processing of Step S1406 and Step S1407 may be omitted. In this case, the flow control setting module 213 advances to Step S1404 after the processing of Step S1405.

The second embodiment has the same effects as those of the first embodiment. In addition, in the second embodiment, the query distributing computer 100 determines whether the flow control is required for each of the divided queries 220. With this configuration, it is possible to set the distributed stream data processing system high in processing performance exhibited across the entire system while maintaining the consistency of processing results.

Third Embodiment

The third embodiment is different from the first embodiment in that the query analysis module 112 takes the type of operation included in the query and a path for aggregation data to be input to the query into consideration in the processing for determining whether the flow control is required. The following description of the third embodiment is mainly directed to differences from the first embodiment.

A configuration of a computer system according to the third embodiment is the same as that of the computer system according to the first embodiment, and hence a description thereof is omitted. A hardware configuration and a software configuration of the query distributing computer 100 in the third embodiment are the same as those of the query distributing computer 100 in the first embodiment, and hence descriptions thereof are omitted. A hardware configuration and a software configuration of the stream data processing computer 120 in the third embodiment are the same as those of the stream data processing computer 120 in the first embodiment, and hence descriptions thereof are omitted.

Information held in the query distributing computer 100 in the third embodiment is the same as the information held in the query distributing computer 100 in the first embodiment, and hence a description thereof is omitted.

Processing executed by the query analysis module 112 in the third embodiment is the same as the processing executed by the query analysis module 112 in the first embodiment, which is illustrated in FIG. 10, and hence a description thereof is omitted. Processing executed by the query execution module 130 in the third embodiment is the same as the processing executed by the query execution module 130 in the first embodiment, which is illustrated in FIG. 12, and hence a description thereof is omitted. Processing executed by the flow control module 230 in the third embodiment is the same as the processing executed by the flow control module 230 in the first embodiment, which is illustrated in FIG. 13, and hence a description thereof is omitted.

Figure 15A:
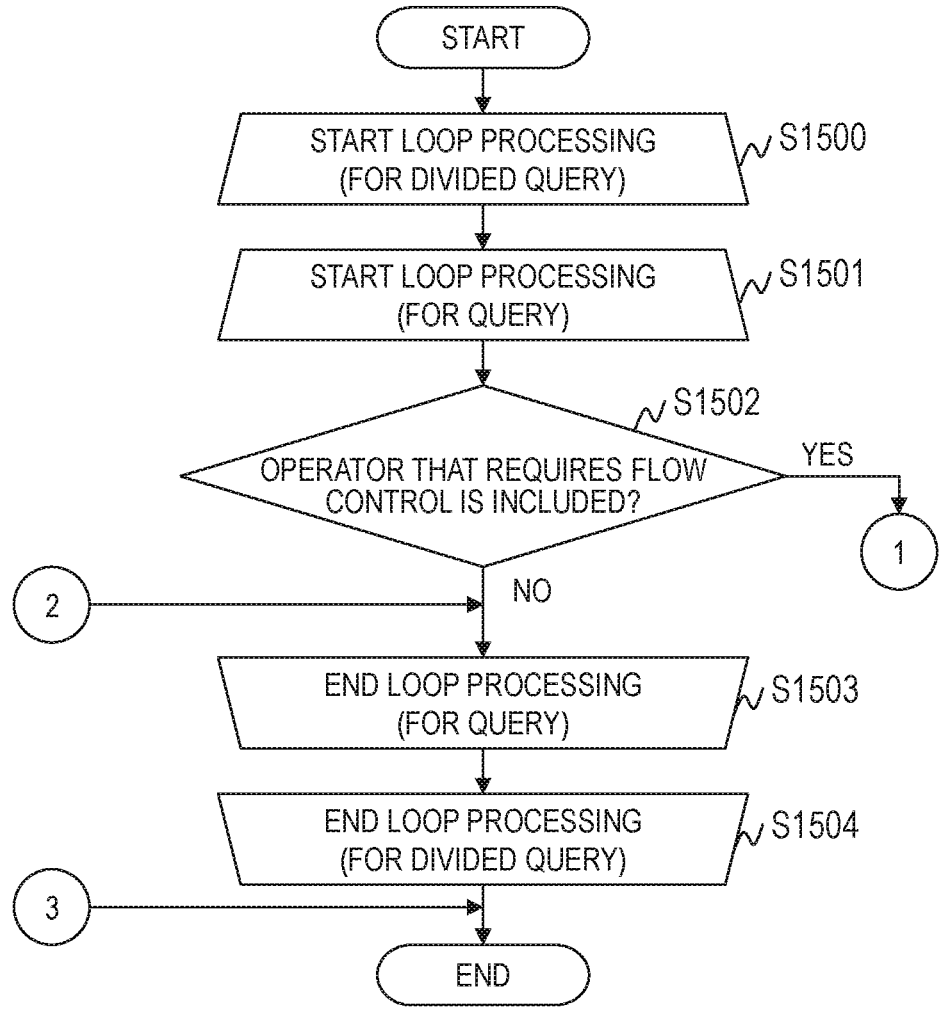
FIG. 15A and FIG. 15B are flowcharts for illustrating an example of the processing for determining whether the flow control is required in a third embodiment.
Figure 15B:
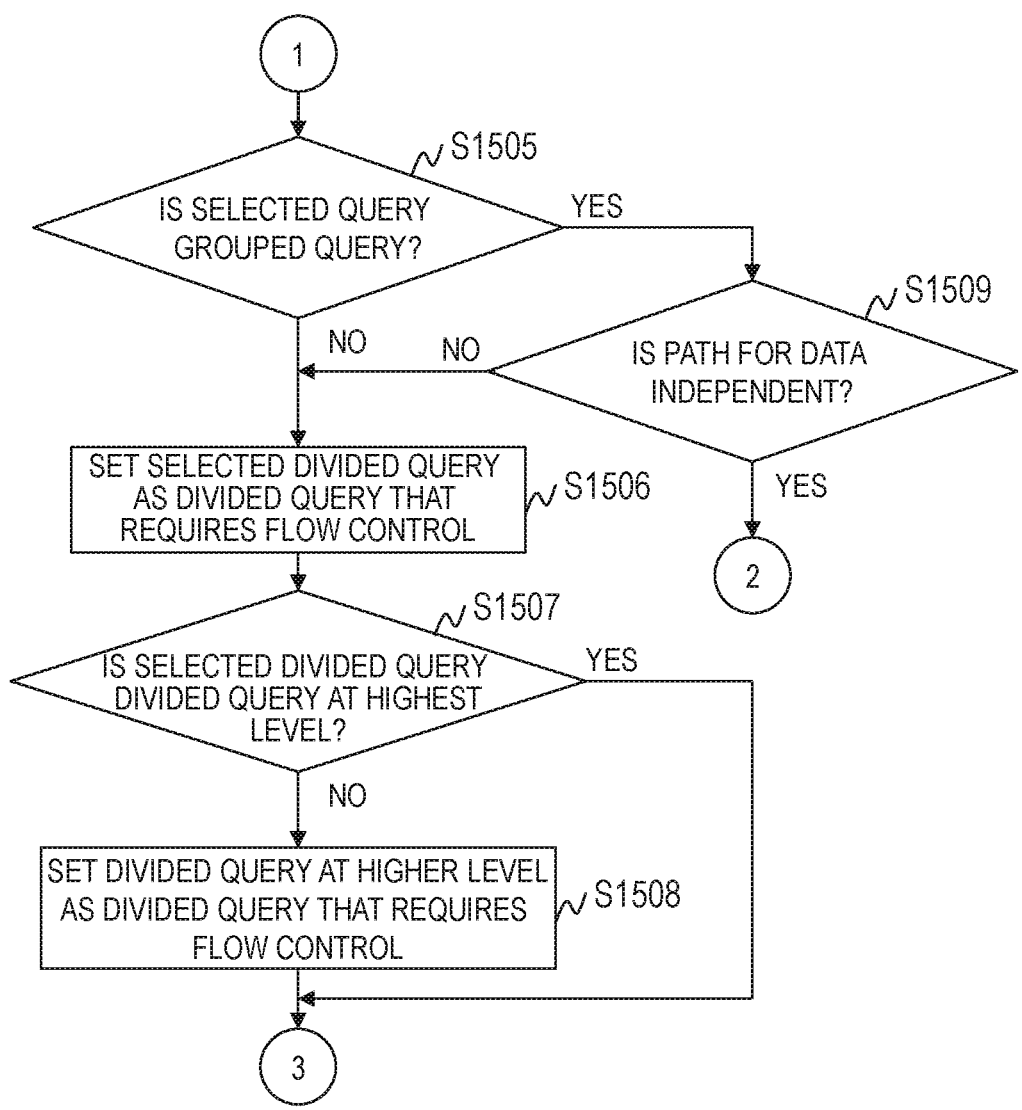

In the third embodiment, the processing for determining whether the flow control is required is partially different. FIG. 15A and FIG. 15B are flowcharts for illustrating an example of the processing for determining whether the flow control is required in the third embodiment.

The flow control setting module 213 starts loop processing for the divided query 220 (Step S1500). The processing of Step S1500 is the same as the processing of Step S1100.

Subsequently, the flow control setting module 213 starts loop processing for the query (Step S1501). The processing of Step S1501 is the same as the processing of Step S1401.

Subsequently, the flow control setting module 213 determines whether the selected query includes an operator that requires the flow control (Step S1502). The processing of Step S1502 is the same as the processing of Step S1402.

In a case where it is determined that the selected query does not include the operator that requires the flow control, the flow control setting module 213 determines whether the processing has been completed for all the queries included in the selected divided query 220 (Step S1503). The processing of Step S1503 is the same as the processing of Step S1403.

In a case where it is determined that the processing has not been completed for all the queries included in the selected divided query 220, the flow control setting module 213 returns to Step S1501 to execute the same processing.

In a case where it is determined that the processing has been completed for all the queries included in the selected divided query 220, the flow control setting module 213 determines whether the processing has been completed for all the divided queries 220 (Step S1504). The processing of Step S1504 is the same as the processing of Step S1102.

In a case where it is determined in Step S1502 that the selected query includes the operator that requires the flow control, the flow control setting module 213 determines whether the selected query is a grouped query (Step S1505). Specifically, the following processing is executed.

The flow control setting module 213 refers to the operator type information 215 to determine whether the selected query includes at least two operators having the grouping 703 set to "YES". At this time, the flow control setting module 213 may execute this determination only for a combination of specific operators. For example, the flow control setting module 213 determines whether the grouping 703 of each of the operator "PARTITION BY" and the operator "GROUP BY" is set to "YES".

In a case where the above-mentioned condition is not satisfied, the flow control setting module 213 determines that the selected query is not a grouped query.

In a case where the above-mentioned condition is satisfied, the flow control setting module 213 determines that the selected query is a grouped query. The processing of Step S1505 is performed in the above-mentioned manner.

In a case where it is determined that the selected query is not a grouped query, the flow control setting module 213 specifies the divided query 220 including the selected query as the divided query 220 that requires the flow control (Step S1506). The processing of Step S1506 is the same as the processing of Step S1101.

Subsequently, the flow control setting module 213 determines whether the selected divided query 220 is the divided query 220 at the highest level (Step S1507). The processing of Step S1507 is the same as the processing of Step S1406.

In a case where it is determined that the selected divided query 220 is the divided query 220 at the highest level, the flow control setting module 213 brings the processing to an end.

In a case where it is determined that the selected divided query 220 is not the divided query 220 at the highest level, the flow control setting module 213 specifies the divided query 220 at a higher level than the level of the selected divided query 220 as the divided query 220 that requires the flow control (Step S1508). After that, the flow control setting module 213 brings the processing to an end. The processing of Step S1508 is the same as the processing of Step S1407.

In a case where it is determined in Step S1505 that the selected query is a grouped query, the flow control setting module 213 determines whether the path for the aggregation data to be input to the selected query is independent (Step S1509).

Specifically, the flow control setting module 213 refers to the path information 216 to retrieve an entry corresponding to the selected query. The flow control setting module 213 further determines whether a key for the grouping within the selected query matches the grouping key 802 of the retrieved entry with the independence 803 being set to "YES".

In a case where the above-mentioned condition is satisfied, the flow control setting module 213 determines that the path for the aggregation data to be input to the selected query is independent. In other words, in a case where a plurality of paths for the aggregation data do not exist, this indicates that the path is independent.

In a case where it is determined that the path for the aggregation data to be input to the selected query is not independent, the flow control setting module 213 advances to Step S1506.

In a case where it is determined that the path for the aggregation data to be input to the selected query is independent, the flow control setting module 213 advances to Step S1503.

In FIG. 15A and FIG. 15B, the flow control setting module 213 executes the processing of Step S1502, Step S1505, and Step S1509 in units of the divided queries 220 in order to retrieve: the divided query 220 including a query including an operator that requires the flow control and is not required to refer to the path information 216; and a divided query including a query that requires the flow control and has the path for the aggregation data being independent.

The third embodiment has the same effects as those of the first embodiment and the second embodiment. In addition, according to the third embodiment, the query distributing computer 100 determines whether the flow control is required in a more detailed manner, which enables the distributed stream data processing system to be set with higher efficiency.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, comprising:
a plurality of computers; and
a management computer configured to assign a plurality of divided queries including at least one query to the plurality of computers,
wherein the plurality of computers each include:
a first processor;
a first memory coupled to the first processor, and which stores instructions that, when executed by the first processor, causes the first processor to execute stream data processing based on the divided queries assigned thereto; and
a first interface coupled to the first processor, for coupling to an external apparatus,
wherein the first memory
wherein the management computer includes:
a second processor;
a second memory coupled to the second processor; and
a second interface coupled to the second processor, for coupling to an external apparatus;
wherein the second memory stores instructions that, when executed by the second processor, cause the second processor to execute:
a parameter input module configured to receive an analysis scenario including a plurality of queries for achieving the stream data processing, and division information for dividing the analysis scenario into the plurality of divided queries, and
a query analysis module configured to analyze the analysis scenario and generate a query graph indicating a structure of the plurality of queries included in the analysis scenario,
wherein the query analysis module is configured to:
specify, based on the analysis scenario and the division information, at least one of the plurality of divided queries that requires flow control for achieving consistency between a generation order of pieces of data to be processed by the at least one query and a reception order of the pieces of data; and
set the flow control for the plurality of computers to each of which the at least one of the plurality of divided queries that requires the flow control is to be assigned in a case where the at least one of the plurality of divided queries that requires the flow control is to be assigned to each of the plurality of computers
wherein the at least one query includes at least one operator,
wherein the second memory further stores operator type information including at least one entry in which a type of the at least one operator is associated with a first flag indicating whether the flow control is required, and
wherein the query analysis module is further configured to:
refer to the operator type information to retrieve a first divided query including one of the plurality of queries that includes an operator that requires the flow control; and
specify the first divided query as the one of the plurality of divided queries that requires the flow control.

2. The computer system according to claim 1, wherein the query analysis module is further configured to specify each of the plurality of divided queries as the one of the plurality of divided queries that requires the flow control.

3. The computer system according to claim 1, wherein the query analysis module is further configured to:
refer to the query graph to retrieve one of the plurality of divided queries being an input source of data to be processed by the first divided query in a case where the first divided query is retrieved; and
specify the retrieved one of the plurality of divided queries as the one of the plurality of divided queries that requires the flow control.

4. The computer system according to claim 1, wherein:
the second memory further stores path information including at least one entry in which identification information on the at least one query is associated with a second flag indicating whether a number of paths for aggregation data is one, the aggregation data is obtained by aggregating based on freely-set identification information and is to be input to the at least one query;
the at least one entry included in the operator type information is associated with a third flag indicating whether the path information is to be referred to; and
the query analysis module is further configured to:
refer to the operator type information to retrieve a second divided query including one of the plurality of queries that includes an operator that requires the flow control and is not required to refer to the path information;
refer to the operator type information and the path information to retrieve a third divided query including one of the plurality of queries that includes an operator that requires the flow control and involves one path for the aggregation data; and
specify each of the second divided query and the third divided query as the one of the plurality of divided queries that requires the flow control.

5. The computer system according to claim 1, wherein:
the first memory of each of the plurality of computers further stores instructions that, when executed by the first processor, causes the first processor to execute:
a data reception module configured to receive data;

a query processing module configured to process the data received by the data reception module based on one of the plurality of divided queries; and a data transmission module configured to transmit a processing result obtained by the query processing module;

the data reception module assigned with the one of the plurality of divided queries for which the flow control is set includes a flow control module configured to execute the flow control;

the flow control module includes a data storage module configured to temporarily store the data; and the flow control module is configured to:

obtain, in a case where the data reception module receives the data, a time included in the received data;

determine whether the time obtained from the received data is included in a predetermined period;

store the received data in the data storage module in a case where the time obtained from the received data is included in the predetermined period; and sort pieces of data stored in the data storage module in a time-series order in a case where the time obtained from the received data is not included in the predetermined period, and output the sorted pieces of data to the query processing module.

6. The computer system according to claim 1, wherein:

the first memory of each of the plurality of computers further stores instructions that, when executed by the first processor, causes the first processor to execute:

a data reception module configured to receive data;

a query processing module configured to process the data received by the data reception module based on one of the plurality of divided queries; and a data transmission module configured to transmit a processing result obtained by the query processing module; and the management computer is configured to set a flow control module configured to execute the flow control in the data reception module in a case where the one of the plurality of divided queries for which the flow control is set is to be assigned to each of the plurality of computers.

7. The computer system according to claim 1, wherein:

the first memory of each of the plurality of computers further stores instructions that, when executed by the first processor, causes the first processor to execute:

a data reception module configured to receive data;

a query processing module configured to process the data received by the data reception module based on one of the plurality of divided queries; and a data transmission module configured to transmit a processing result obtained by the query processing module;

the data reception module includes a flow control module configured to execute the flow control in an inactive state; and the management computer is configured to set the flow control module to an active state in a case where the one of the plurality of divided queries for which the flow control is set is to be assigned.

8. A method of setting a stream data processing system, which is executed in a computer system including a management computer configured to assign a plurality of divided queries including at least one query to the plurality of computers, and a plurality of computers each configured to execute stream data processing based on the divided queries assigned thereto, the method comprising:

receiving an analysis scenario including the plurality of queries for achieving the stream data processing and division information for dividing the analysis scenario into the plurality of divided queries;

analyzing the analysis scenario to generate a query graph indicating a structure of the plurality of queries included in the analysis scenario;

specifying, based on the analysis scenario and the division information, at least one of the plurality of divided queries that requires flow control for achieving consistency between a generation order of pieces of data to be processed by the at least one query and a reception order of the pieces of data;

setting the flow control for the plurality of computers to each of which the at least one of the plurality of divided queries that requires the flow control is to be assigned in a case where the at least one of the plurality of divided queries that requires the flow control is to be assigned to each of the plurality of computers, wherein the at least one query includes at least one operator, wherein the management computer stores operator type information including at least one entry in which a type of the at least one operator is associated with a first flag indicating whether the flow control is required, and wherein the specifying of the at least one of the plurality of divided queries that requires flow control includes:

referring to the operator type information to retrieve a first divided query including one of the plurality of queries that includes an operator that requires the flow control; and specifying the first divided query as the one of the plurality of divided queries that requires the flow control.

9. The method of setting a stream data processing system according to claim 8, wherein the specifying of the at least one of the plurality of divided queries that requires flow control includes specifying each of the plurality of divided queries as the one of the plurality of divided queries that requires the flow control.

10. The method of setting a stream data processing system according to claim 8, wherein the specifying of the first divided query as the one of the plurality of divided queries that requires the flow control includes:

referring to the query graph to retrieve one of the plurality of divided queries being an input source of data to be processed by the first divided query; and specifying the retrieved one of the plurality of divided queries as the one of the plurality of divided queries that requires the flow control.

11. The method of setting a stream data processing system according to claim 8, wherein:

the management computer further stores path information including at least one entry in which identification information on the at least one query is associated with a second flag indicating whether a number of paths for aggregation data is one, the aggregation data is obtained by aggregating based on freely-set identification information and is to be input to the at least one query;

the entry included in the operator type information is associated with a third flag indicating whether the path information is to be referred to; and the specifying of the at least one of the plurality of divided queries that requires flow control includes:

referring to the operator type information to retrieve a second divided query including one of the plurality of queries that includes an operator that requires the flow control and is not required to refer to the path information;

referring to the operator type information and the path information to retrieve a third divided query including one of the plurality of queries that requires the flow control and involves one path for the aggregation data; and specifying each of the second divided query and the third divided query as the one of the plurality of divided queries that requires the flow control.

12. The method of setting a stream data processing system according to claim 8, wherein:

each of the plurality of computers is configured to:

receive data;

perform stream data processing on the received data based on one of the plurality of divided queries assigned thereto; and transmit a processing result of the stream data processing;

the one of the computers assigned with the one of the plurality of divided queries for which the flow control is set is configured to execute the flow control and configured to temporarily store the data;

the method further comprising:

obtaining, by the one of the computers, a time included in the received data;

determining, by the one of the computers, whether the time obtained from the received data is included in a predetermined period;

storing, by the one of the computers, the received data in a case where the time obtained from the received data is included in the predetermined period; and sorting, by the one of the computers, pieces of the stored data in a time-series order in a case where the time obtained from the received data is not included in the predetermined period, and outputting the sorted pieces of data for the stream data processing.

13. The method of setting a stream data processing system according to claim 8, wherein:

each of the plurality of computers is configured to:

receive data;

perform stream data processing on the received data based on one of the plurality of divided queries assigned thereto; and transmit a processing result of the stream data processing; and execute the flow control in response to setting by the management computer.

* * * * *